(12) United States Patent
Tesch

(10) Patent No.: US 6,758,492 B2
(45) Date of Patent: Jul. 6, 2004

(54) CURTAIN AIR BAG INCLUDING INFLATABLE PERIMETER GAS CHANNEL

(75) Inventor: Todd E. Tesch, Tipp City, OH (US)

(73) Assignee: Delphi Technology, Inc., Troy, MI (US)

( * ) Notice: Subject to any disclaimer, the term of this patent is extended or adjusted under 35 U.S.C. 154(b) by 0 days.

(21) Appl. No.: 10/263,861

(22) Filed: Oct. 3, 2002

(65) Prior Publication Data

US 2003/0111829 A1 Jun. 19, 2003

Related U.S. Application Data

(60) Provisional application No. 60/341,796, filed on Dec. 18, 2001.

(51) Int. Cl.[7] .............................................. B60R 21/22
(52) U.S. Cl. ................................................ 280/730.2
(58) Field of Search .......................... 280/730.2, 730.1, 280/743.1, 743.2, 728.1

(56) References Cited

U.S. PATENT DOCUMENTS

| | | | |
|---|---|---|---|
| 5,788,270 A | 8/1998 | Haland et al. ............... 280/729 |
| 6,042,141 A | * 3/2000 | Welch et al. ................ 280/729 |
| 6,073,961 A | 6/2000 | Bailey et al. ............. 280/730.2 |
| 6,135,492 A | 10/2000 | Zimmerbeutel et al. . 280/730.2 |
| 6,135,493 A | 10/2000 | Jost et al. ................ 280/730.2 |
| 6,155,596 A | * 12/2000 | Nakajima et al. ......... 280/730.2 |
| 6,168,191 B1 | 1/2001 | Webber et al. ........... 280/730.2 |
| 6,176,514 B1 | * 1/2001 | Einsiedel ................. 280/730.2 |
| 6,199,898 B1 | 3/2001 | Masuda et al. .......... 280/730.2 |
| 6,220,625 B1 | 4/2001 | Wallner et al. .......... 280/730.2 |
| 6,224,091 B1 | 5/2001 | Eyrainer et al. ......... 280/730.2 |
| 6,237,937 B1 | * 5/2001 | Kokeguchi et al. ...... 280/730.2 |
| 6,293,581 B1 | * 9/2001 | Saita et al. .............. 280/730.2 |
| 6,338,498 B1 | 1/2002 | Neiderman et al. |
| 6,422,593 B1 | 7/2002 | Ryan |
| 6,454,296 B1 | 9/2002 | Tesch et al. |
| 6,454,298 B1 | 9/2002 | Hardig et al. |
| 6,471,240 B2 | * 10/2002 | Bakhsh et al. ............... 280/729 |
| 6,481,743 B1 | 11/2002 | Tobe et al. |

* cited by examiner

Primary Examiner—Paul Dickson
Assistant Examiner—Faye M. Fleming
(74) Attorney, Agent, or Firm—Scott A. McBain

(57) ABSTRACT

An air bag restraint system for a transportation vehicle. The restraint system includes an inflatable curtain having a gas inlet, an upper edge, a lower edge and a perimeter. A gas emitting inflator is in fluid communication with the gas inlet. The inflatable curtain includes an inflatable flow channel in fluid communication with the gas inlet. The inflatable flow channel extends at least partially around the inflatable curtain in a path such that at least a potion of the inflation gas is communicated through the inflatable flow channel and along the lower edge.

15 Claims, 2 Drawing Sheets

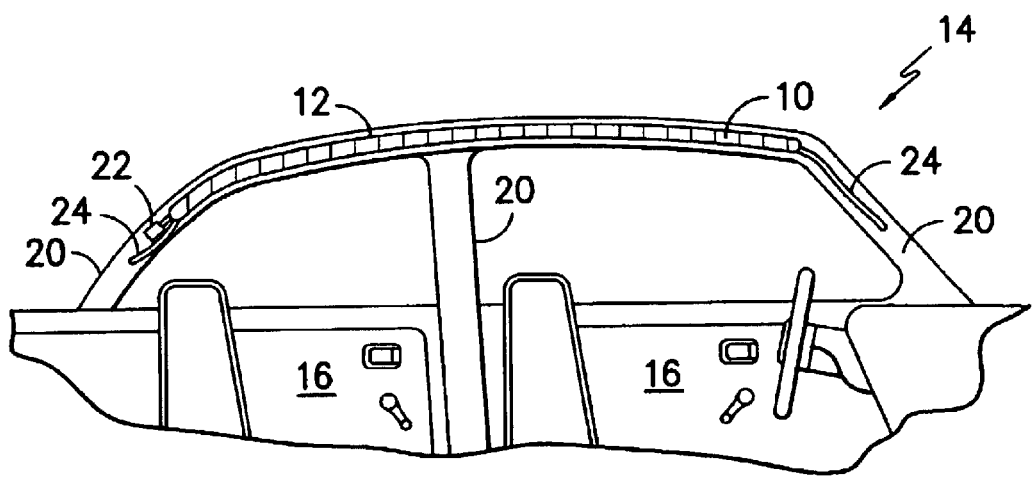
FIG. —1A—
PRIOR ART
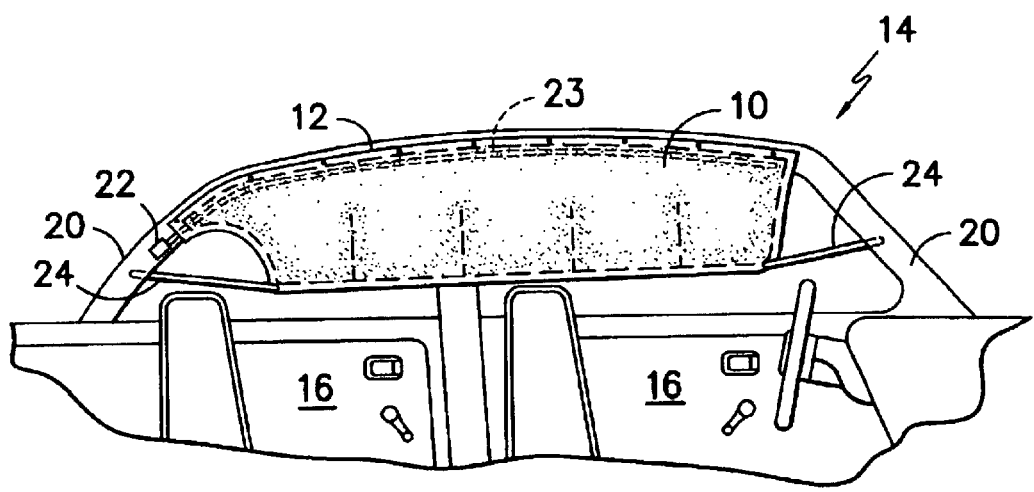
FIG. —1B—
PRIOR ART

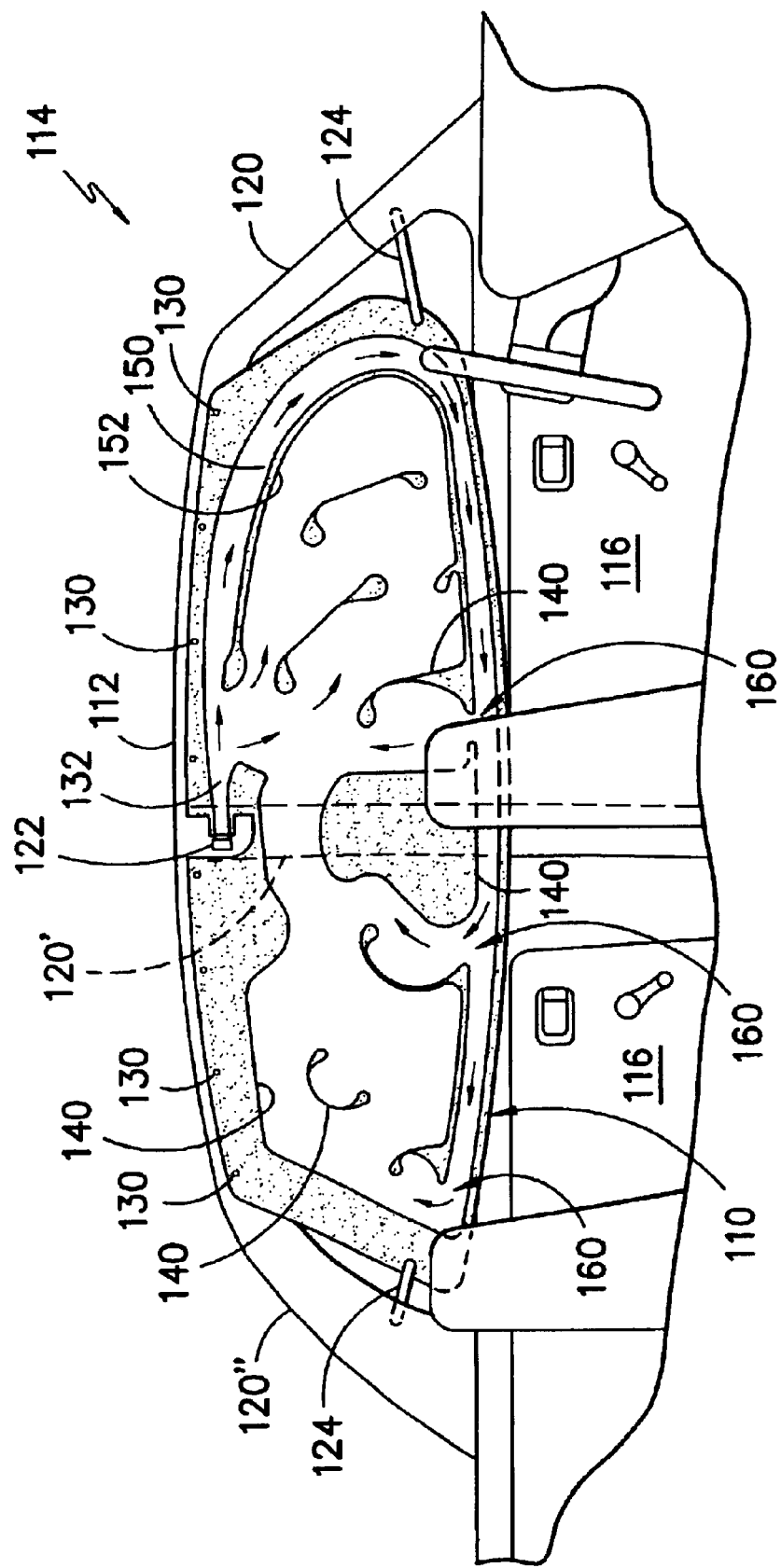
FIG. -2-

CURTAIN AIR BAG INCLUDING INFLATABLE PERIMETER GAS CHANNEL

CROSS-REFERENCE TO RELATED APPLICATION

This application claims priority from prior provisional application No. 60/341,796 filed 18 Dec. 2001, the contents of which are incorporated by reference as if set forth herein in their entirety.

TECHNICAL FIELD

This application relates to air bag assemblies for use in protection of vehicle passengers during a collision event and more particularly to a curtain air bag assembly adapted for rapid inflated deployment away from a storage position for coverage across an extended region between an occupant and a side portion of a vehicle interior.

BACKGROUND OF THE INVENTION

It is well known in motor vehicles to provide air bag cushions for protection of a vehicle occupant during a collision event wherein such air bag cushions are in fluid communication with gas generating inflators so as to inflate the cushions upon sensing predetermined vehicle conditions such as deceleration exceeding a certain level. It is further known to provide air bag systems including inflatable restraint cushions which are deployed from positions of attachment along the roof rail portion of the vehicle frame above the doors of the vehicle such that the inflatable cushion extends downwardly in substantially curtain-like fashion between the occupant to be protected and the side portions of the vehicle adjacent to such occupants. Such coverage provides a cushioning restraint to the occupant during a side impact or extended roll-over collision event thereby aiding in the protection of the occupant during such events.

It is generally desirable for a curtain-like side air bag cushion to be deployed rapidly away from the roof rail in a substantially even manner. Such deployment aids in the establishment of an early effective containment barrier between the occupant to be protected and the windows or other side portions of the vehicle being covered.

In order to achieve the desired rapid uniform deployment of the curtain-like cushion a number of different techniques have been utilized. One such technique which has been utilized is to fill the cushion from an inflator disposed at one end of the cushion such as at a rearmost structural pillar of the vehicle. If desired, the uniformity of gas filling along the length of the cushion may be augmented by use of a perforated gas transmission lance along the length of the cushion. One such arrangement is illustrated and described in U.S. Pat. No. 6,135,492 to Zimmerbeutel et al. the contents of which are incorporated by reference herein. The efficiency of inflation has also been augmented by closing portions of the cushion off from inflation gas in regions where impact protection is not critical. Such configurations are disclosed in U.S. Pat. No. 6,168,191 to Webber et al. the contents of which are incorporated by reference herein. It is also known to utilize substantially vertically oriented gas conveying cells extending between the upper edge and the lower edge of the cushion. One such construction is described in U.S. Pat. No. 5,788,270 to HAland the contents of which are incorporated by reference herein.

A typical prior curtain cushion is illustrated in FIGS. 1A and 1B. As illustrated, in such prior embodiments an inflatable curtain 10 is stored in packed relation generally along the roof rail 12 of a vehicle 14 above the doors 16. The length of the inflatable curtain 10 is such that upon inflation coverage is provided over at least a portion of the distance extending along the side of the vehicle interior between two or more structural pillars 20 extending away from the roof rail 12. In the illustrated embodiment the inflatable curtain 10 is shown to be attached at the forward "A" pillar and at the rearward "C" pillar so as to cover the intermediate "B" pillar. In the illustrated construction the inflatable curtain 10 is inflated by a gas generating inflator 22 housed at the "C" pillar and connected to a gas diffuser tube 23 running along the upper edge of the curtain 10 thereby causing the curtain 10 move downwardly away from the roof rail 12. As the inflatable curtain 10 undergoes inflation, it tends to shorten as cushioning depth is developed (FIG. 1B). This shortening may be restricted by the presence of tethering straps 24 of fixed length extending between the lower edge of the inflatable curtain 10 and the forward and rearward pillars 20 bordering the area to be covered.

In the illustrated prior design, the diffuser tube is utilized to avoid preferential initial inflation of the curtain 10 at the end nearest the inflator 22. That is, the inflation gas is dispersed substantially uniformly along the upper edge across the length of the curtain 10 without regard to the location of the inflator 22. While such a construction may be effective, it has the deficiency of requiring the presence of the diffuser tube 23 which may add cost as well as requiring added storage space along the roof rail 12. As will be appreciated, in many vehicle designs such space may be limited.

SUMMARY OF THE INVENTION

The present invention provides advantages and alternatives over the prior art by providing a curtain air bag system incorporating an inflatable curtain including a gas accepting mouth feeding into a gas conveying inflatable channel extending in a path along at least a portion of the curtain perimeter. The use of a separate diffuser tube may be eliminated. In addition, the gas accepting mouth may be located at any position along the length of the curtain thereby permitting a cooperating gas emitting inflator to be housed at any location as may be desired for a given vehicle design.

BRIEF DESCRIPTION OF THE DRAWINGS

The following drawings which are incorporated in and which constitute a part of this specification illustrate an exemplary embodiment of the present invention and, together with the general description above and the detailed description set forth below, serve to explain the principles of the invention wherein:

FIGS. 1A and 1B are cut-away side views of a vehicle incorporating a prior-art curtain air bag system; and FIG. 2 is a cut-away side view similar to FIG. 1B illustrating an air bag system incorporating an inflatable gas channel defining a circuitous fill path around the perimeter of an inflatable curtain.

While the invention has been illustrated and generally described above and will hereinafter be described in connection with certain potentially preferred embodiments and procedures, it is to be understood and appreciated that in no event is the invention to be limited to such illustrated and described embodiments and procedures. On the contrary, it is intended that the present invention shall extend to all alternatives and modifications as may embrace the broad principles of this invention within the true spirit and scope thereof.

DESCRIPTION OF THE PREFERRED EMBODIMENTS

Reference will now be made to FIG. 2, wherein elements corresponding to those previously described in FIGS. 1A and 1B are designated by like reference numerals increased by 100. As shown, in the illustrated exemplary construction the inflatable curtain 110 is attached along the roof rail 112 at attachment points 130 disposed at the upper edge of the curtain 110. By way of example only, the attachment points 130 may be in the form of eyelets adapted for receipt of fasteners such as screws, snap-in fasteners and the like for insertion into the roof rail in a manner as will be well known to those of skill in the art. Of course, such an attachment arrangement is exemplary only and any other suitable arrangement may likewise be utilized if desired.

As shown, the curtain 110 preferably includes a gas inlet opening 132 in fluid communication with the inflator 122 so as to permit the introduction of a gaseous inflation medium into the curtain 110 upon the occurrence of predetermined vehicle conditions. According to a potentially preferred practice, the curtain 110 is formed by adjoining panels of substantially pliable material around a perimeter edge so as to form a gas tight enclosure such that the inflation gas entering the curtain may be contained during an extended roll-over event. By way of example only, it is contemplated that such a structure may be formed either from a single blank of material which is folded upon itself and thereafter seamed around its open sides or from two or more panels joined together in a overlying cooperative relationship.

Regardless of the particular formation practice used, it is contemplated that the curtain 110 will include a front impact surface which faces into the vehicle 114 towards the occupant to be protected and a rear surface facing away from the occupant to be protected. In addition, the curtain 110 preferably includes a patterned arrangement of regions of substantially noninflatable character 140 disposed across the curtain 110. As shown by the directional arrows, gas emitting from the inflator 122 passes around the regions of substantially noninflatable character 140 so as to provide a desired inflation profile.

In the illustrated arrangement the inflator 122 is mounted at a central intermediate position along the length of the curtain 110 such as at an intermediate pillar 120' located between a forward pillar 120 and a rear pillar 120". In the illustrated arrangement inflation gas is directed generally towards the forward portion of the curtain 110 (i.e. in the direction of forward vehicle travel). However, if desired the curtain may be reversed and inflation gas may be directed generally towards the rear portion of the curtain.

Regardless of the orientation of the inflator 122, it is contemplated that at least a portion of the inflation gas will be directed into and along a perimeter flow channel 150 which extends at least partially around the perimeter of the curtain 110. As illustrated, the perimeter flow channel is separated from the interior of the curtain by a discontinuous arrangement of barrier elements defining an inboard channel wall 152. By way of example only, it is contemplated that the barrier elements may be in the form of so called zero length tethers at which the face and rear panels of the curtain 110 are joined together such as by welding, sewing, adhesives or the like. Of course other gas blocking structures such as webs or the like may likewise be utilized if desired. As illustrated, it is contemplated that at least portions of the inboard channel wall 152 may be defined by the outboard facing edges of regions of noninflatable character 140 which border the perimeter flow channel.

As illustrated, the inboard channel wall 152 preferably includes an arrangement of gas passages 160 arranged along the length of the perimeter flow channel 150 so as to establish controlled fluid communication between the perimeter flow channel 150 and the interior of the curtain 110. As shown, the pattern of the perimeter flow channel 150 is preferably such that at least a portion of the inflation gas is carried to the lower edge of the curtain prior to entering the interior of the curtain 110. In this manner the lower edge of the curtain undergoes rapid inflation at an early stage of gas emission without the need to fully fill the entire body of the curtain. Such early stage inflation of the lower edge may be beneficial in bringing the curtain 110 into its proper deployment position in a rapid and efficient manner.

As will be appreciated, the actual number and placement of the gas passages 160 feeding into the interior of the curtain 110 may be the subject of wide variation depending upon the configuration of the curtain 110. However, it is believed that that a spaced disbursement of gas passages at various locations along the length of the lower edge may be beneficial in achieving substantially uniform inflation over the entire length.

In the illustrated configuration the gas inlet opening 132 is shown as feeding a portion of the inflation gas directly into the interior of the curtain rather than being passed into the perimeter flow channel 150. That is, the gas flow path exiting the inlet opening is substantially "Y" shaped with one prong leading into the interior of the curtain and with the other prong leading into the perimeter flow channel 150. In such a configuration, the curtain 110 may be simultaneously filled from both the top and from the bottom as gas is expelled from the inflator 122. Such filling may be advantageous in some situations. Of course, the entire gas flow may be directed into the perimeter flow channel by extending the inboard channel wall 152 towards the gas inlet opening 132 in which case the curtain 110 may be filled exclusively through the gas passages 160.

As will be appreciated, the utilization of the perimeter flow channel 150 allows a directional inflator 122 to be positioned in a manner to project inflation gas in one direction and to thereafter redirect at least a portion of the inflation gas in another direction as needed to effect uniform filling. Thus, the inflator may be placed at substantially any location within the vehicle as may be desired. Moreover, the utilization of the perimeter flow channel 150 also affords the ability to provide early stage inflation along the lower edge so as to rapidly deploy the curtain 110 to the desired position. Finally, filling by inflation gas may be achieved substantially uniformly along the length of the curtain 110 without the need for additional diffuser tube elements.

It is to be understood that while the present invention has been illustrated and described in relation to potentially preferred embodiments, constructions, and procedures, such embodiments, constructions, and procedures are illustrative only and that the present invention is in no event to be limited thereto. Rather, it is contemplated that modifications and variations embodying the principles of the present invention will no doubt occur to those of ordinary skill in the art. In particular, it is to be understood that the present invention is in no way limited to any particular curtain geometry or gas flow pattern. It is therefore contemplated and intended that the present invention shall extend to all such modifications and variations as may incorporate the broad aspects of the present invention within the true scope and spirit thereof.

What is claimed is:

1. An air bag restraint system for a transportation vehicle, the restraint system comprising:

an inflatable curtain including a gas inlet, an upper edge, a lower edge and a perimeter, wherein the inflatable curtain is adapted to inflate away from a vehicle roof line in covering relation to a side portion of the vehicle upon introduction of an inflation gas; and a gas emitting inflator in fluid communication with the gas inlet, wherein the inflatable curtain includes an inflatable flow channel in fluid communication with the gas inlet, the inflatable flow channel extending at least partially around the inflatable curtain in a path inboard of the perimeter such that at least a potion of the inflation gas is communicated through the inflatable flow channel and along the lower edge, wherein the inflatable flow channel is bounded by a flow barrier disposed between the inflatable flow channel and an interior portion of the inflatable curtain, wherein the flow barrier is discontinuous along the length of the inflatable flow channel so as define a plurality of gas passages between the inflatable flow channel and the interior portion of the inflatable curtain, such that at least a portion of the inflation gas is communicated through the inflatable flow channel and into the interior portion of the inflatable curtain through said plurality of gas passages.

2. The air bag restraint system as recited in claim 1, wherein at least a portion of the flow barrier comprises outboard edges of regions of noninflatable character.

3. The air bag restraint system as recited in claim 1, wherein at least a portion of said plurality of gas passages are disposed between the interior portion of the inflatable curtain and the lower edge of the inflatable curtain.

4. An air bag restraint system for a transportation vehicle, the restraint system comprising:

an inflatable curtain including an upper edge, a lower edge and a perimeter, wherein the inflatable curtain includes a gas inlet disposed along the upper edge and is adapted to inflate away from a vehicle roof line in covering relation to a side portion of the vehicle upon introduction of an inflation gas; and a gas emitting inflator in fluid communication with the gas inlet, wherein the gas inlet feeds into an interior portion of the inflatable curtain so as to transport a first portion of the inflation gas from the gas inlet into the interior portion of the inflatable curtain, and wherein the inflatable curtain includes an inflatable flow channel in fluid communication with the gas inlet, the inflatable flow channel extending at least partially around the inflatable curtain in a path inboard of the perimeter such that a second portion of the inflation gas is communicated through the inflatable flow channel and along the lower edge, wherein the inflatable flow channel is bounded by a flow barrier of substantially noninflatable character disposed between the inflatable flow channel and the interior portion of the inflatable curtain.

5. The air bag restraint system as recited in claim 4, wherein the flow barrier comprises a zero length tether.

6. The air bag restraint system as recited in claim 5, wherein the zero length tether is formed by a method selected from the group consisting of welding, sewing and adhesive bonding.

7. The air bag restraint system as recited in claim 4, wherein the flow barrier is discontinuous along the length of the inflatable flow channel so as define a plurality of gas passages between the inflatable flow channel and the interior portion of the inflatable curtain, such that at least a percentage of said second portion of inflation gas is communicated through the inflatable flow channel and into the interior portion of the inflatable curtain through said plurality of gas passages.

8. The air bag restraint system as recited in claim 7, wherein at least a portion of the flow barrier comprises outboard edges of regions of noninflatable character facing towards the perimeter.

9. The air bag restraint system as recited in claim 7, wherein at least a portion of said plurality of gas passages are disposed between the interior portion of the inflatable curtain and the lower edge of the inflatable curtain such that at least a percentage of said second portion of the inflation gas is fed into the interior portion at a location along the lower edge.

10. An air bag restraint system for a transportation vehicle, the restraint system comprising:

an inflatable curtain including an upper edge, a lower edge and a perimeter, wherein the inflatable curtain includes a gas inlet disposed along the upper edge and is adapted to inflate away from a vehicle roof line in covering relation to a side portion of the vehicle upon introduction of an inflation gas; and a gas emitting inflator operatively connected to the gas inlet at a central portion of the upper edge, wherein the gas inlet feeds into an interior portion of the inflatable curtain so as to transport a first portion of the inflation gas from the gas inlet into the interior portion of the inflatable curtain, and wherein the inflatable curtain includes an inflatable flow channel in fluid communication with the gas inlet, the inflatable flow channel extending at least partially around the inflatable curtain in a path inboard of the perimeter such that a second portion of the inflation gas is communicated through the inflatable flow channel and along the lower edge, wherein the inflatable flow channel is bounded by a flow barrier of substantially noninflatable character disposed between the inflatable flow channel and the interior portion of the inflatable curtain.

11. The air bag restraint system as recited in claim 10, wherein the flow barrier comprises a zero length tether.

12. The air bag restraint system as recited in claim 11, wherein the zero length tether is formed by a method selected from the group consisting of welding, sewing and adhesive bonding.

13. The air bag restraint system as recited in claim 10, wherein the flow barrier is discontinuous along the length of the inflatable flow channel so as define a plurality of gas passages between the inflatable flow channel and the interior portion of the inflatable curtain, such that at least a percentage of said second portion of inflation gas is communicated through the inflatable flow channel and into the interior portion of the inflatable curtain through said plurality of gas passages.

14. The air bag restraint system as recited in claim 13, wherein at least a portion of the flow barrier comprises outboard edges of regions of noninflatable character facing towards the perimeter.

15. The air bag restraint system as recited in claim 13, wherein at least a portion of said plurality of gas passages are disposed between the interior portion of the inflatable curtain and the lower edge of the inflatable curtain such that at least a percentage of said second portion of the inflation gas is fed into the interior portion at a location along the lower edge.

* * * * *